Patented May 20, 1930

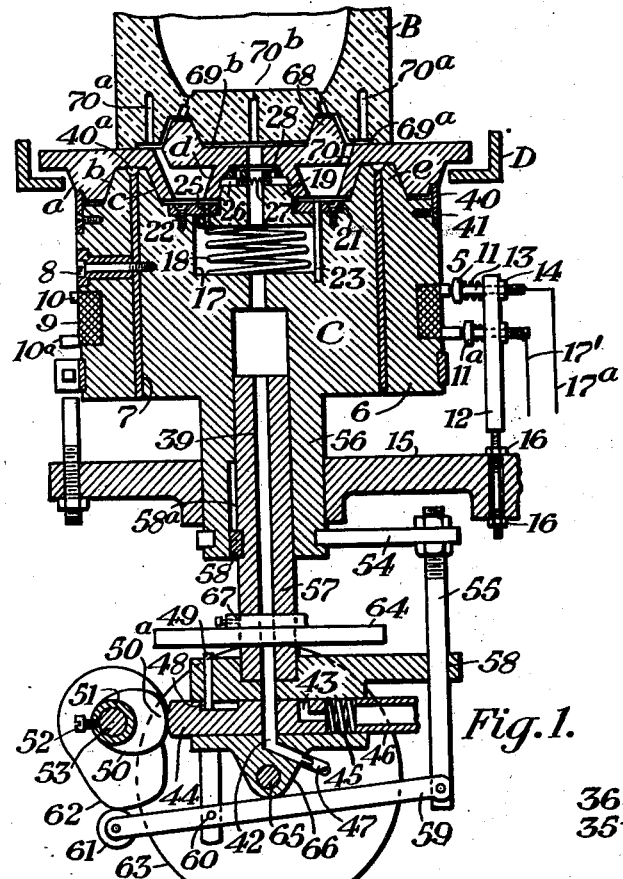

1,759,058

UNITED STATES PATENT OFFICE

WILLIAM J. MILLER, OF SWISSVALE, PENNSYLVANIA

METHOD OF AND MEANS FOR PRODUCING POTTERY WARE

Application filed February 24, 1927. Serial No. 170,613.

This invention relates to a method and means for chucking molds in the manufacture of pottery, and the primary object of the same is to provide means which will operate to more positively associate the mold with the chuck during the jiggering operation, and also establish an abnormal atmospheric condition in the porous mold body and which will be communicated to the clay or article of ware in or on the mold, with resultant advantages in the production of pottery ware as will hereinafter appear.

More specifically, the invention relates to means for establishing an abnormal atmospheric condition in the porous mold body and at the same time provide for a more positive association of the mold with the chuck and prevent the mold from tilting on the chuck when the latter is operated to raise and rotate and lower the mold, or simply contact with and rotate the mold, during the jiggering operation, said means being adapted to be embodied in or associated or combined with the chuck, or with the chuck and mold, in such manner as to ensure automatic operation at all times without manual observation or attendance.

A further object of the invention is to prevent tilting of the mold on the chuck due to the horizontal pressure of the profile during the jiggering operation on relatively high molds such as those used for cups, bowls, etc., and also to prevent slippage of the mold on the chuck, and when the mold is constructed with a metal base, slippage of the body on the base during rotation of the chuck in the jiggering operation.

Another object of the invention is to provide a chuck and mold construction which will permit successive chucking of different styles of molds without changing chucks or mold bases.

Another object of the invention is to provide means for automatically evacuating the air from the porous mold body and set up a vacuum between the mold and charge and prevent air bubbles forming beneath the charge as well as water pockets, to thus ensure uniform and increased adhesion of the charge to the mold and prevent slippage and wrinkling of the charge during the jiggering operation, and also speed up initial water extraction and drying of the charge.

Other objects and advantages of the invention will become apparent as the description develops in connection with the drawings.

The improved means may be embodied in, or associated with, the chuck and mold, and is particularly adapted for use in connection with the structure disclosed by my co-pending application, Serial No. 159,395, filed January 6, 1927, which has become Patent No. 1,697,993, Jan. 8, 1929, and molds constructed in accordance with the disclosure of my co-pending application Serial No. 162,140, filed January 19, 1927.

In the drawings:—

Fig. 1 is a longitudinal vertical section, partly broken through, of a spindle, chuck and mold embodying the features of my invention, part of the operating mechanism being shown in side elevation.

Fig. 2 is a similar view with the electromagnet omitted.

Fig. 3 is an enlarged detail sectional view of the screw structure.

Fig. 4 is an enlarged detail view, partly in section and side elevation, of a modification of the screw structure.

Fig. 5 is a detail view of one of the parts.

Fig. 6 is a detail sectional view, partly diagrammatic, of a modification in the switch means.

Referring to Fig. 1 of the drawings, A designates the metal base of the mold and B the body portion, which is usually molded from plaster of Paris or other porous material. The mold is shown in elevated position and carried by the chuck, generally indicated by C, which is normally operated to raise and rotate and lower the mold during the jiggering operation, as will be understood by referring to my co-pending application, Serial No. 159,395. When the chuck is lowered, the mold rests on the tray D, which is usually pivotally mounted and forms part of an endless conveyor, as will also be understood by referring to above Patent No.

1,697,993. However, the molds may be applied and removed manually.

The chuck C is shown provided with an electro-magnet generally indicated at 5, and it will be understood that the manner of embodying this structure could be varied within the scope of the invention, the construction herein shown being simply for the purposes of illustration. In the present instance the chuck C has applied therearound a ring 6 of suitable metal and insulated from the chuck as at 7, said ring being secured to the chuck by an insulated screw bolt 8. The metal ring 6 is provided with a coil 9, which in turn is provided with commutator rings 10 and 10$^a$, adapted to contact with brushes 11 and 11$^a$, yieldingly and adjustably mounted in a support 12 as by springs 13 and threaded collars 14, the support being also adjustably mounted as by inserting the same in the frame 15 of the jiggering mechanism and retained in adjusted position as by lock nuts 16. The brushes 11$^a$ and 11 connect with wires 17' and 17$^a$ leading to a source of current supply.

The chuck is shown in raised position and the brushes 11 and 11$^a$ contacting with the commutator rings and the metal ring 6 energized. When the chuck lowers, the commutators 10 and 10$^a$ will move out of contact with the brushes 11 and 11$^a$ and deenergize the ring 6. The dwell of energization may be controlled by broadening or narrowing the brushes 11 and 11$^a$ or the commutator rings 10 and 10$^a$ and also by adjusting the brush support 12. The base A of the mold being of suitable metal, the energization of the ring 6 will cause the base to be attracted thereto and cause the mold to adhere to and rotate with the chuck, and upon de-energization of the said ring, the mold will be released.

It is obvious that various forms of make and break devices or switches could be adopted for use in connection with the electro-magnet 5 without departing from the scope of the invention, the make and break method herein shown being simply to illustrate one manner of accomplishing this result. The position of energization of the electro-magnet 5 may be governed by adjusting the brush support 12, and it will also be understood that the commutator could be placed at different points on the chuck or on the spindle, and likewise, the ring 6 could be of varying forms and placed in the middle of the chuck or any other operative point. Also, the electro-magnet 5 may be operated through switch means, such, for instance, as hereinafter described in connection with Fig. 6, to permit intermittent energization and de-energization without raising and lowering the chuck. The amount of current applied may be regulated by the usual controlling devices well known in the electric art.

The chuck C is shown provided with a central recess 17, in which I prefer to seat a spring 18, which acts as a cushioning means for a stud 19, shown in detail by Figs. 3 and 4. I prefer to construct this stud 19 with a lower annular shoulder 20, the stud being inserted in the recess on the spring and removably retained therein by a collar 21, adapted to fit over the annular shoulder 20 and be secured to the chuck as by screws 22. To prevent rotary movement and at the same time permit vertical sliding movement of the stud 19, a pin 23 is secured in the collar 21 and extends through a vertical groove 24 in the shoulder 20, and projects a suitable distance into the recess 17. The shoulder 20 and collar 21 have registering holes formed therein to provide a passage 25, for a purpose which will be hereinafter explained. The upper portion of the stud 19 preferably has slidably mounted therein in transverse alinement pins 26, abutting at one extremity against a spring 27, and retained in the stud as by vertical pins 28 which are secured in the pins 26 vertical slots or openings 29 being formed in the top of the stud of such width as to accommodate the desired horizontal sliding movement of the pins 26. In assembling, the spring 27 may be inserted in the horizontal guide bore for the pins 26 and the said pins inserted on each side of the stud 19 to abut against said spring and the pins 28, then driven or otherwise secured into the pins 26 through the vertical slots 29, as will be clearly understood by referring to Fig. 3.

The base of the mold may have varying shapes imparted thereto as will be understood by referring to my co-pending application Serial No. 162,140, and in the present instance I have shown only a preferred form. The under side of the base as shown herein is particularly formed with a view towards centering the mold on the chuck and also on the tray, and the top of the said base to facilitate the application of all shapes and sizes of molds. For the purposes of description, the under portion of the base may be considered as having a number of annular walls indicated at $a$, $b$, $c$ and $d$, the wall $a$ being formed by an annular downwardly and inwardly inclined shoulder and offset portion which acts as a centering means for the mold on the tray D. The walls $b$ and $c$ are oppositely inclined to provide a centering means for the mold base on the chuck C, said chuck being formed with an annular boss $e$ which fits into the recess provided by the walls $b$ and $c$, when the mold rests on the chuck. The inner annular wall $d$ is inclined downwardly and outwardly, to provide a centering recess 30 for the stud 19. The inner side of the wall $d$ is formed with threads 31, the root of these threads being of such width as to accommodate the pins 26. When the chuck is raised and rotated the pins 26 will automatically engage the threads 31 and cause the mold to rotate with the chuck, and by cushioning the stud 19 and also the pins 26, any difference in the speed of elevation of the chuck relatively to the speed at which the stud 19 threads itself into the recess 30 will be compensated for.

The angle of the thread 31 may be modified as desired and the number of threads varied. It will be seen that by the use of this structure, the grip of the chuck on the mold increases as the resistance to rotation, due to application of the profile, increases.

The annular boss $e$ also provides a centering recess 32 (see Fig. 2) in the chuck, the recess 17 for the spring 18 and stud 19 being formed in the bottom of the said recess 32.

To cause the mold to automatically disengage itself from the chuck when lowered onto the tray D, I prefer to form an annular groove around the lower extremity of the chuck for placement of a band 33, Fig. 5, which may be similar to the ordinary brake band, a bolt 34 being passed through the clamping extremities of the band and an adjusting spring 35 applied over said bolt between the band and an adjusting and securing nut 36. By adjusting the nut 36, the slipping action of the band 33 may be controlled. The head of the bolt 34 also serves as a contact means relatively to a stop stud 37 which is adjustably threaded in the frame 15 of the jiggering mechanism and secured in adjusted position by an adjusting nut 38. When the rotating chuck and mold are lowered, the head of the bolt 34 will strike the stop lug 37, causing the chuck to come to a stop, the suddenness of which may be regulated by adjusting the slippage of the band 33, and the mold being free to rotate, will unthread and disengage itself automatically from the stud 19. The spring 35 also serves to compensate for expansion of the band 34 when the latter is applied around the metal ring 6 as in Fig. 1, which may be due to application of electric current, or heat generated by friction due to slippage.

One preferred method of applying suction or vacuum to the mold is herein shown, and it will be understood that this particular structure may be varied and is simply shown to illustrate one method of accomplishing this result. In the present instance I show a central vertical passageway or bore 39 extending through the spindle, chuck, stud 19 and base A of the mold. This passageway 39 opens into the recess 17 or is broken at this point, being continued through the stud 19, and as the recess 17 communicates with the recess 32 through the passages 25, suction applied to the passageway 39 will also be applied to the recess 32 in the chuck.

Around the upper peripheral portion of the chuck C I prefer to attach a sealing ring or valve 40, which may be of rubber or other suitable material and secured as by screws 41, this ring projecting upwardly over the line of contact of the chuck and base of the mold when the chuck has risen and engaged the mold as shown in Fig. 1. The sealing action of this valve will be increased as the suction or vacuum is increased. The passageway 39 is continued down into the stationary supporting frame for the spindle and is adapted to alternately register with ports or passages 42 and 43 formed through a plunger valve, generally indicated at 44, said plunger working against the pressure of a spring 45, interposed between the plunger 44 and a pipe 46, which forms a continuation of the port 43 and which may be threaded in the frame as shown and open into the atmosphere or be connected with sub or super atmosphere. The port 42 is adapted to register with a continuation of the passage 39, into which is threaded a pipe 47 adapted to be connected with suitable suction or vacuum applying means. To prevent rotative movement of the plunger 44, a suitable longitudinal groove 48 is formed therein and a pin 49 secured vertically in the frame and projects into said groove. A ring of rubber or other material may be applied on the chuck preferably at the top of the boss $e$, as at 40$^a$, to assist in the sealing action of the valve 40.

To operate the plunger valve 44 in timed relation to the jiggering operation, a cam 50 is adjustably mounted as by a hub 51 and a screw 52 on the drive shaft 53, said cam having a high part 50$^a$. For the purposes of illustration, part of the usual mechanism for raising and rotating and lowering the mold is shown, and comprises a cross fork 54, adjustably connected to a pitman 55 at one extremity and at its opposite extremity fitting in an annular groove or necked portion in the outer member 56 of the chuck spindle. The inner or drive member 57 of the spindle has secured thereto a key 58, slidable in a vertical groove 58$^a$ formed in the outer member 56, to permit independent vertical movement of said member 56 and at the same time cause said member 56 to rotate with the member 57. The pitman 55 is slidably supported in the frame as at 55$^a$ and at its lower extremity has pivoted thereto the one extremity of a lever 59, said lever being fulcrumed as at 60 to an extension bracket which may be secured to the stationary frame of the jiggering mechanism. At its opposite extremity the lever 59 has rotatably mounted thereon a cam roller 61, which engages a cam 62 adjustably mounted on the shaft 53. As will be understood, when the cam 62 is rotated, the chuck will be raised and lowered, and these movements may be adjusted and timed to practically perform the desired jiggering operation.

By referring to my co-pending applications Serial No. 143,994, filed October 25, 1926, and Serial No. 166,180, filed February 5, 1927, which has become Patent No. 1,655,431, dated Jan. 10, 1928, the preferred structure for imparting intermittent rotation to the chuck and spindle may be readily understood. However, for the purposes of illustration, friction disks 63 and 64 are shown as comprising part of this structure, the disk 63 being adjustably splined on a shaft 65, which has bearing in a supporting bracket 66 secured to or forming part of the stationary frame of the mechanism, and the disk 64 is adjustably secured on the member 57 of the chuck spindle, as at 67. The disk 63 may be driven continuously and through mechanism clearly described in my co-pending applications above noted, intermittently contacts with and rotates the disk 64 and through the latter the spindle and chuck.

The mold construction herein shown may be understood by referring to my co-pending application Serial No. 162,140, and it is not necessary that the mold be constructed with a metal base in the present instance, as a plaster mold could be used by application of vacuum as a means for causing the mold to rotate with the chuck. However, it is preferred to use a metal base, and in the present instance the base A is formed on its upper surface with an annular ridge or boss 68, and the plaster body B with a corresponding recess and seated on the base, a space being provided between the mold and mold base as at 69, to allow for the difference in relative expansion and/or contraction of the metal base A and body portion B. This expansion and contraction may result from various causes, as for instance heat ensuing by reason of the application of electric current and also from the varying temperatures of the drying chamber, and in some instances it may be desirable to extend the space 69 on the other side of annular ridge or boss 68 or reverse the position of these spaces. The taper given to the sides of the ridge or boss 68 provides for quick application of molds, and these walls may be of varying shapes or straight, as desired, as more fully described in my co-pending application Serial No. 162,140. The base is provided with a plurality of holes or passages 70, and the body B with holes 70ª, connecting with the passages 70 through the spaces 69ª and 69ᵇ, if desired, and also with the vertical passage 39. These holes 70ª may continue into the mold by vents or pin holes or minute passages 70ᵇ. These holes 70ª and vents serve to set up suction between the mold and clay charge when first applied and prevent air bubble and water pocket formations between the mold and charge and ensure adhesion of the charge to the mold and thus also prevent slippage and wrinkling of the wet charge, which in many instances is very thin, as will be understood. This suction action also speeds up initial water extraction and drying of the charge, and retains the mold body on the base.

Super-atmosphere or air under pressure may also be applied to the air passages of the chuck and communicated through the porous mold or the holes and vents in the latter to the under portion of the clay charge or formed ware that may be in or on the mold, to assist in ejecting or act to repel the charge or article of ware and also overcome any tendency of the latter to adhere to the mold. This operation may be desired when removing the formed ware from the mold and for other operations during the manufacture of the ware. If the force of the super-atmosphere or air under pressure should have a tendency to dislodge the mold relatively to the chuck, the electro-magnet structure and/or the stud and pin construction heretofore described may be used to maintain the mold in stable position on the chuck during application of air under pressure or super-atmosphere.

In operation, the cam 50 may be adjusted relatively to the cam 62 on the shaft 53 so that the high part 50ª will contact with the plunger 44 and cause the port 42 to register with the passage 39 and tube or member 47 at any time after the top edge of the valve 40 reaches the level of the outer wall of the mold base when the chuck is being raised, and set up suction through the passage 39 and cause more or less of a vacuum, or sub-atmospheric condition to exist,—the degree of which may be governed by suitable regulating means well known in the engineering art,—between the chuck and mold base and also between the body portion B and base A through the passages 70, and this suction may be communicated through the holes 70ª to the charge-receiving surface of the mold, or the mold per se, or between the charge and mold when the charge is applied. The holes 70ª may have varying sizes of vents or pinhole openings communicating with the mold cavity or charge-receiving surface, or it may be desired to dispense with these small communicating openings and depend upon the porous character of the mold body, or a reduced portion of the same, for withdrawal of moisture and air from beneath the charge. It is preferred to rotate the chuck intermittently as in my co-pending applications hereinbefore noted, although the chuck may be rotated continuously, if desired, by independent motive means, in which event the stud 19 may be rendered inoperative as hereinafter described. As hereinbefore described, the commutator brushes 11 and 11ª of the electro-magnet 5 may be adjusted to energize the ring 6 at any preferred position when the chuck is raised and rotated, and this adjustment may be made relatively to the adjustment of the plunger valve 44, to apply suction and electric current at the same time or approximately the same time or at different times or positions of the chuck C, and the dwell of application of the electro-magnet and/or vacuum may be short or long as found most advantageous. The stud 19 may be used to co-operate with the electro-magnet 5 and plunger valve 44, or may be readily removed by detaching the plate 21 and pin 23. However, it is preferred to use the stud 19, to provide a positive means for causing rotation of the mold on the chuck, in the event the fluid means may not be considered of a positive enough character.

It will be seen that varying forms of molds may be chucked in succession and in this regard, either the mold body B may be changed, or different forms of mold bodies applied on the same base, or the complete mold changed, or varying forms of molds applied to the same form of chuck, both the mold body and base being interchangeable relatively to the base and chuck, and further, plaster molds and molds with metal bases may be chucked in succession, the vacuum efficiently operating with either molds with metal bases or all plaster molds.

Fig. 4 shows a slight modification in the thread formed in the recess 30, the thread being indicated at 31ª in this instance, and it will be understood that varying forms of screws and threads may be adopted within the scope of the invention. The pins 26 may be removed from the stud 19, or the threads 30 and 31ª omitted from the recess 30, and said stud and recess 30 co-operate as a centering means for the mold on the chuck, and also permit successive chucking or threaded and non-threaded molds. Also, by omitting the annular walls c and d or either c or d the construction of the base may be simplified and the wall b act as a centering means, or the wall b omitted and c and d or either c or d retained. Furthermore, the annular ridge or boss 68 on the upper surface of the base A could be omitted if desired and the body B centered on the base by various other constructions, it being understood that the invention is not confined to the specific construction of the mold body or base as illustrated in the drawings. It may be desired to reduce the porous character of all or parts of the exterior surface of the mold to increase the effect of suction on the interior portion of the mold, as for instance by the application of a suitable coating. It will be noted that only a circumferential portion of the body B rests on the mold base, and this portion of the body acts as a seal, and this may be aided by applying a suitable annular washer.

Fig. 6 illustrates a form of switch which may be installed in connection with the plunger valve 44, and which also serves to prevent drag of the electro-magnet 5 by reversing the polarity of the ring 6 after de-energization of the electro-magnet. This switch may also be used in timed relation with the plunger valve 44 in the event the chuck C is simply rotated and not reciprocated or raised and lowered. The frame of the mechanism above and below the plunger 44 is extended to provide supporting brackets 70° for contacts 71, 72, 73 and 74. It is preferred to so mount these contacts that they may be slidably adjusted, and this may be accomplished by slotting the brackets 70 and fastening the contacts to bolts 75 which are suitably insulated from the supports 70 by insulation material and fiber washers 76, the bolts being passed through the slots and adjustably secured in position by nuts 77. The plunger 44 may be of suitable insulating material and has secured thereon contact strips 78 and 79 of resilient material, said strips having wires 78ª and 79ª connected thereto and leading to a source of electric current. The contacts 71 and 72 have wires 71ª and 72ª connected thereto which lead to the commutator brushes 11ª and 11 respectively. The contact 71 connects with the contact 74 by the wire 71ª, and the contact 72 with the contact 73 by the wire 72ª.

In operation, if it is desired to simply rotate the chuck C and not raise and lower the same, the contacts 72 and 74 may be adjusted in the slotted supports 70 so that the contact strips 78 and 79 bear thereagainst during the dwell of application of the vacuum, or during the time the head of the plunger 44 is being pressed inwardly by the high part 50ª of the cam 50, the strips 78 and 79, being of spring-like metal, permitting regulation of the dwell of application of the electric current, or the contacts 72 and 74 may be adjusted along the supports 70 so that the contact strips 78 and 79 will bear thereagainst and slide thereover while the plunger 44 is being further depressed or simply contact therewith at the innermost position of said plunger, as should be readily understood. The wires 17' and 17ª may be disconnected when using this switch.

In the event it is desired to reverse the polarity of the electro-magnet 5 after de-energization of the sam , the contacts 71 and 73 may be adjusted along the supports 70 so that they will contact with the contact strips 78 and 79 on the return movement of the plunger 44. The current will then be reversed, thus reversing the poles of the electro-magnet 5. This will serve to prevent drag of the electro-magnet 5 and ensure prompt release of the mold from the chuck. If the chuck is reciprocated during the foregoing operation, it will be understood that the brushes 11 and 11ª may be adjusted to remain in contact with rings 10 and 10ª until the reversing of current has taken place. The cam 50 may also be changed in shape if found necessary to accommodate the application of the switch to the plunger 44.

What is claimed as new is:—

1. In the manufacture of pottery, the method which consists in providing a chuck and mold with communicating passages and applying sub-atmosphere to the mold through said passages during the jiggering operation, to evacuate air and excess moisture deposits from between the chuck and mold and the mold and charge of plastic material.

2. In a pottery forming machine, in combination, a chuck provided with air passages, a mold constructed of porous material, and means for creating a sub-atmospheric condition in said passages of the chuck when in engagement with said mold, to set up a suction action through the porous material of the latter.

3. In the manufacture of pottery, the method which consists in providing a chambered chuck, and creating a sub-atmospheric condition in said chamber when a mold is engaged by said chuck, to retain the mold in temporary positive engagement with the chuck.

4. In the manufacture of pottery, the method which consists in rotating the chuck and mold, and establishing a sub-atmospheric condition between the mold and chuck to retain the mold in association with the chuck during rotation thereof.

5. In the manufacture of pottery, the method which consists in providing a chuck and mold with communicating passageways and applying super-atmosphere to the ware or clay in or on the mold through the mold body, to exert an impelling action on the said ware or clay.

6. In a jigger for pottery forming machines, in combination, a chuck provided with passageways, a mold constructed of porous material, and means for applying super-atmosphere to the mold when seated on the chuck, to force air through the porous material of the mold.

7. In the manufacture of pottery, the method which consists in intermittently electrically energizing the chuck to retain the mold in association with the chuck during rotation thereof.

8. In the manufacture of pottery, the method which consists in raising and rotating the chuck and mold during application of the charge, applying sub-atmosphere and electric current to evacuate air and excess moisture deposits between the chuck and mold and between the mold and charge, and also to retain the mold in association with the chuck during rotation of the latter, and automatically releasing the mold from the chuck by lowering the latter.

9. In a pottery forming machine, a chuck and spindle provided with means for establishing a vacuum between the chuck and a mold.

10. In a pottery forming machine, a chuck and spindle formed with a chamber adapted to be closed by contact with a mold, and means for exhausting air from the chamber.

11. In a jigger for pottery forming machines, a chuck provided with passageways, and a valve adapted to control the admission of a fluid medium to said passageways.

12. In a pottery forming machine, a chuck provided with a recessed portion to receive a mold, an annular sealing valve, a spindle provided with an air passage and a valve, said last-named valve being adapted to alternately open and close said passage.

13. In a pottery forming machine, a chuck provided with a recess and a valve and a spindle having an air passage leading to said recess and adapted to be connected with suction means, said recess being intermittently sealed by the valve and base of a mold through the normal operation of the jigger.

14. In a pottery forming machine, a chuck provided with a recess and an annular sealing valve, a spindle provided with an air passage terminating at one extremity in the recess and at its opposite extremity in a plunger valve, said plunger valve being operable to alternately close and open said air passage.

15. In a pottery forming machine, a chuck provided with a recessed portion to receive a mold, a sealing valve surrounding said recess, a spindle provided with an air passage terminating at one extremity in said recess, a valve adapted to alternately open and close said passage, and means for operating said valve.

16. In a pottery forming machine, in combination, a mold and chuck formed with air passages, means for rotating and reciprocating said chuck, and means for applying sub-atmosphere to the mold through the said passages to prevent the formation of air bubbles and water pockets between the mold and a charge of plastic material as well as slippage of the charge in the mold during the jiggering operation.

17. In a jigger for pottery forming machines, means for causing a positive rotation of the mold with the chuck.

18. In a jigger for pottery forming machines, fluid means for intermittently establishing a positive association of the chuck with a mold.

19. In a jigger for pottery forming machines, means for establishing vacuum and electric contact between a chuck and mold.

20. In a pottery forming machine, a chuck provided with an electro-magnet and air-evacuating means, and means for intermittently operating said magnet and air-evacuating means through the normal operation of the jigger.

21. In a pottery forming machine, a chuck and spindle provided with an electro-magnet, coil and commutators and air-evacuating means including a valve, brush contact being intermittently established with the commutators through the normal operation of the jigger.

22. Jiggering mechanism for pottery forming machines, comprising a chuck and spindle, means for raising and rotating and lowering the chuck, and means for automatically electrically energizing and de-energizing said chuck.

23. Jiggering mechanism for pottery forming machines, comprising a chuck and spindle, means for raising and rotating and lowering the chuck, and means for automatically electrically charging the chuck through the raising action of the chuck.

24. Jiggering mechanism for pottery forming machines, comprising a chuck and spindle, means for raising and rotating and lowering the chuck, and means for automatically electrically energizing and de-energizing the chuck through the raising and lowering action of the chuck.

25. In a pottery forming machine, a chuck and spindle, means for raising and rotating and lowering the chuck, means for automatically energizing and de-energizing the chuck, and means for setting up suction through the chuck and spindle in timed relation to the raising and rotating and lowering of the chuck.

26. In a pottery forming machine, a chuck constructed as an electro-magnet, and switch means mounted in operative adjacency to the chuck for controlling the flow of electric current to said magnet.

27. In a pottery forming machine, in combination, a chuck and spindle, means for raising and rotating and lowering said chuck, a mold adapted to be in contact with the chuck and provided with a metal base, an electro-magnet forming part of the chuck, means for evacuating air from between the chuck and mold base and setting up suction through the body of the mold, and means for energizing and de-energizing the electro-magnet.

28. In a pottery forming machine, in combination, a mold provided with a porous body and a metal base, a chuck provided with an electro-magnet and a recessed portion to receive the base of the mold, an annular sealing valve applied on the chuck around said recess, and means for evacuating air from said recess to form a vacuum between the chuck and mold and set up suction through the porous body of the mold.

29. In a pottery forming machine, in combination, a chuck and spindle, means for raising and rotating and lowering said chuck, a mold adapted to be raised and rotated and lowered by the chuck and provided with a metal base, an electro-magnet forming part of the chuck, means for applying sub-atmosphere to the mold and chuck, means for energizing and de-energizing the electro-magnet, and means for changing the polarity of said magnet upon de-energization thereof.

30. The combination as set forth in claim 29, wherein the means for applying sub-atmosphere, energizing and de-energizing the electro-magnet and changing the polarity of said magnet are operable through unitary switch means.

31. In a pottery forming machine, in combination, a chuck and mold, said chuck being provided with an electro-magnet and said mold being constructed with a base of non-insulating metal, and means for electrically energizing and de-energizing said chuck.

32. In a pottery forming machine, a chuck provided with an annular metal ring, insulated therefrom, a coil and commutator rings, and switch means automatically actuated through the normal operation of the jigger.

33. In combination, a mold and chuck respectively provided with male and female members which automatically engage and disengage through reciprocation and rotation of the chuck.

34. In combination, a mold and chuck respectively provided with a recess and resiliently mounted stud constructed to automatically engage and disengage through raising and rotation and lowering of the chuck.

35. In a pottery forming machine, in combination, a recessed chuck, a tray and mold, said mold being constructed with a porous body and a metal base, the walls of the latter being shaped to provide a female member and centering means for the mold on the chuck and also on the tray, a male member disposed in the recess of the chuck and adapted to be received in said female member of the mold base, said male member being provided with resiliently mounted pins and said female member with a helical groove, and means for reciprocating and rotating said chuck whereby the male member of the chuck is caused to automatically positively engage and disengage the female member of the mold.

36. The combination as set forth in claim 35, wherein said male member is resiliently mounted in the recess of the chuck.

37. In a pottery forming machine, in combination, a recessed chuck provided with an electro-magnet, means for raising and rotating and lowering the chuck, a tray and mold, said mold being constructed with a porous body and metal base, the walls of which are shaped to provide a female member and chamber and centering means for the mold on the chuck and also on the tray, a male member disposed in the recess of the chuck and adapted to be received in said female member of the mold base, an annular sealing valve surrounding the recess in the chuck and operating to seal the chamber in the base of the mold when the mold rests on the chuck, and means for intermittently evacuating air from said chamber and porous body and energizing the electro-magnet through the raising and lowering action of the chuck.

38. The combination as set forth in claim 29, wherein the male and female members are provided with means for automatically and positively associating the mold with the chuck.

Signed by me this 23rd day of February, 1927.

WILLIAM J. MILLER.